Patented Nov. 6, 1951

2,574,155

UNITED STATES PATENT OFFICE 2,574,155

SUBSTITUTED AMINO-NITROHETEROCYCLES AND METHODS OF PREPARING THE SAME

Robert P. Parker, Somerville, and John S. Webb, Bound Brook, N. J., assignors to American Cyanamid Company, New York, N. Y., a corporation of Maine No Drawing. Application March 30, 1950,
Serial No. 152,984

12 Claims. (Cl. 260—256.5)

This invention relates to new organic compounds. More particularly, it relates to water soluble derivatives of amino-nitroheterocycles and methods of preparing the same.

One of the most destructive diseases in turkey husbandry is enterohepatitis (blackhead). The disease is caused by a protozoan organism called *Histomonas meleagridis* harbored in the egg of cecal worms common to poultry such as turkeys and chickens. When a new flock is allowed to roam on land where turkeys or chickens formerly were raised, this disease often manifests itself with great rapidity and the mortality in a flock of young birds may reach 80% or higher.

It has been found that certain amino-nitro heterocycles, hereinafter described, are effective both as a prophylactic and in the therapeutic treatment of blackhead in turkeys. These compounds were found to be effective in some 0.01% or less to 1.5% of the total sustenance ingested by the turkeys. Generally, they are administered as a part of the diet. In raising turkeys the food is often changed several times from a mash to a mixture of grains, pellets, etc. and to be continuously effective as a prophylactic, obviously the compounds must be available in each type of food. Since the food is often varied, this method is costly and inconvenient. Also, when therapeutic levels of drugs are required, the higher content sometimes renders the food unpalatable to the birds.

As the mixing of the compounds with the poultry feed has many undesirable features, a more suitable method of administering the compounds is highly desirable. Although the drugs may be administered in the drinking water, their relative insolubilities in water make this mode of administration subject to other difficulties in that considerable time and effort are required to prepare a solution of therapeutic strength. However, we have now found that these active amino-nitro-heterocycles can be prepared in the form of certain derivatives which are readily dissolved in the drinking water in proper proportions to give the desired concentration. This permits dispensing the compounds in a concentrated solution to be mixed with the drinking water in the desired proportions. The new compounds may be described as members of the group having the following general formulas:

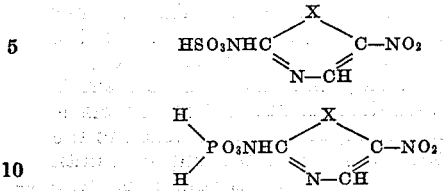

in which X may be one of the following linking groups —N=CH—, —CH=CH—, or —S— and alkali metal or alkaline earth metal salts thereof.

These compounds are light to dark yellow crystalline solids which are readily soluble in water.

These salts of the nitro-2-heterocyclesulfamic acids can be prepared by the reaction of a sulfur trioxide-tertiary amine adduct such as the one from triethylamine and sulfur trioxide, with the 2-amino-nitroheterocycle in an organic solvent such as ethylenedichloride at an elevated temperature. Although the 2-amino-nitroheterocycle, tertiary amine and sulfur trioxide may be mixed in any desired sequence, it is believed that the sulphur trioxide and tertiary amine first form an adduct which then reacts with the 2-amino-nitroheterocycle. The amine salt of the nitro-2-heterocyclesulfamic acid thus produced may be isolated and used as such although it is usually more convenient to evaporate part of the solvent, treat the residue with an aqueous alkali metal hydroxide, remove most of the remaining solvent and amine under reduced pressure, and isolate the alkali metal salt of the nitro-2-heterocyclesulfamic acid by cooling, evaporation, salting-out or a combination of these three methods. Other tertiary amines may be used such as N-ethylmorpholine, trimethylamine, pyridine, and the like. Also chlorosulphonic acid may be employed in place of sulfur trioxide in a tertiary organic base such as pyridine. Other organic solvents such as chloroform, dioxane, etc. may be employed.

The reaction may also be carried out in an aqueous medium in the presence of an acid-binding substance or by simple fusion of the tertiary amine-sulfur trioxide adduct and the 2-aminonitroheterocycle.

Among the compounds which may be used as intermediates in the present process are 2-amino-5-nitrothiazole; 2-amino-5-nitropyridine; 2-amino-5-nitropyrimidine; and the like.

The amido phosphoric acid derivatives may be prepared by reacting the amino-nitroheterocycle with phosphorus oxychloride to obtain the corresponding nitroheterocycle amidophosphoryl chloride. This product can then be reacted with an alkali metal or alkaline earth metal hydroxide to obtain the alkali metal or alkaline earth metal salt of the nitroheterocycle amidophosphoric acid.

The process of the present invention will be further illustrated by the following examples wherein various amino-nitroheterocycles are used as intermediates to prepare the final products of the invention.

*Example 1*

A mixture of 2-amino-5-nitrothiazole, 160 parts; triethylamine-sulfur trioxide, 200 parts; and ethylene dichloride, 310 parts, is stirred and heated at refluxing temperature on a steam bath for 30 minutes. About one-half of the solvent is then removed under reduced pressure from a water bath at 50°–60° C. To the residue is added a solution of sodium hydroxide, 40 parts, in water, 1,000 parts. The mixture is then further heated under reduced pressure until all the ethylene dichloride and triethylamine have been removed. The clear, dark aqueous solution is then treated with decolorizing carbon and clarified. Sodium chloride, 100 parts, is added to the solution and then it is cooled to about 5° C. until crystallization of the product is complete. The tan, crystalline powder is filtered off, washed with ethanol and acetone and dried. Yield, 115 parts of sodium-(2-sulfamino-5-nitrothiazole). It can be purified by recrystallization from water and is then obtained as a light yellow crystalline solid. 100 ml. of water at 25° C. will dissolve about 50 g. of the product.

*Example 2*

A mixture of 2-amino-5-nitropyrimidine, 14 parts, triethylamine-sulfur trioxide, 19 parts, and ethylenedichloride, 50 parts, is stirred and heated at refluxing temperature on a steam bath for 30 minutes. About one-half of the solvent is then distilled off under reduced pressure from a water bath at 50°–60° C. To the residue is added a solution of sodium hydroxide, 4 parts in 100 parts of water and distillation is continued under reduced pressure until all of the ethylenedichloride and triethylamine have been removed. The remaining aqueous solution is treated with decolorizing carbon and clarified. Sodium chloride, 10 parts, is added to the solution and then it is cooled to about 5° C. until separation of the product is complete. The yellow crystalline solid is filtered off, washed with acetone and vacuum dried. A yield of 11 parts of sodium-(2-sulfamino-5-nitropyrimidine) is obtained. It is soluble in water to the extent of about 14 g. in 100 ml. at 25° C.

*Example 3*

A mixture of 40 parts of 2-amino-5-nitropyridine, 53 parts of triethylamine-sulfur trioxide and 140 parts of ethylene dichloride are refluxed and stirred for thirty minutes and then cooled. The solid which separates is filtered off and dried. Seventy parts of this solid is dissolved in 700 parts of warm water and then 44 parts of 5 N sodium hydroxide solution is added. The solution is then vacuum stripped at 50° C. until essentially all of the liberated triethylamine has distilled over. After clarification, 100 parts of saturated sodium chloride solution is added to the stripped solution and the mixture is cooled to 5° C. The sodium-(2-sulfamino-5-nitropyridine) which crystallizes out in the form of almost white, shiny, irregular plates is filtered off, washed with acetone and dried. A yield of 35 parts is obtained. It is soluble in 100 ml. of water at 25° C. to the extent of about 6.5 g.

*Example 4*

A mixture of 40.4 parts of 2-amino-5-nitrothiazole and 100 parts (by volume) of phosphorus oxychloride is refluxed for about twenty minutes until all the solid dissolves. The mixture is cooled and stirred with petroleum ether. The solid which separates is filtered, washed well and extracted with hot ethylene chloride. The extracts are chilled to obtain N-(5-nitro-2-thiazolyl)amidophosphoryl chloride in the form of a crystalline solid. The compound decomposes with effervescence to a clear melt between 150° C. and 155° C., the exact point being dependent on the rate of heating.

Two hundred and sixty-two parts of the above product is dissolved in water by the addition of one hundred sixty parts of sodium hydroxide. The solution is cooled and stirred vigorously while the alkali is added slowly to avoid a large local excess of alkali. The product obtained is the sodium salt of N-(5-nitro-2-thiazolyl)-amidophosphoric acid and is soluble in water to the extent of about 5 g. in 100 ml. at 25° C.

*Example 5*

The free N-(5-nitro-2-thiazolyl)amidophosphoric acid is isolated by allowing a solution of 262 parts of the dichloride of Example 4 in acetone to stand with 36 parts of water. The free acid separates as a somewhat gelatinous solid which is filtered and dried in a vacuum desiccator.

We claim:

1. Compounds of the group consisting of those having the general formulas:

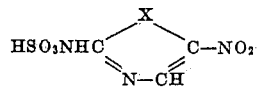

and

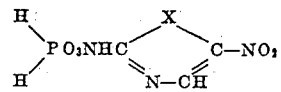

in which X is a member of the linking groups consisting of —N=CH—, —CH=CH— and —S—, alkali metal salts and alkaline earth metal salts.

2. Compounds of the group consisting of those having the general formula:

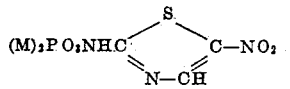

in which M is an alkali metal radical.

3. Compounds of the group consisting of those having the general formula:

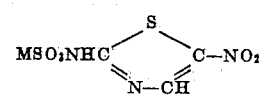

in which M is an alkali metal radical.

4. Sodium-(2-sulfamino-5-nitrothiazole).
5. Sodium-(2-sulfamino-5-nitropyrimidine).
6. Sodium-(2-sulfamino-5-nitropyridine).

7. Sodium salt of N-(5-nitro-2-thiazolyl)-amido phosphoric acid.

8. A method of preparing compounds selected from the group consisting of alkali metal and alkaline earth metal salts of compounds having the general formula:

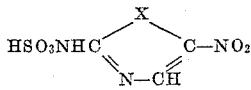

in which X is selected from the linking groups consistnig of —N=CH—, —CH=CH— and —S—, which comprises heating a compound having the formula:

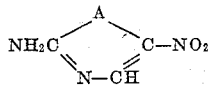

in which X is as defined above with the adduct of a tertiary amine and a member of the group consisting of sulfur trioxide and chlorosulphonic acid and subsequently with a member of the group consisting of alkali metal and alkaline earth metal hydroxides.

9. A method of preparing compounds having the formula:

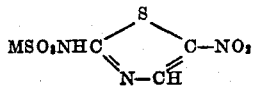

in which M is an alkali metal radical which comprises heating 2-amino-5-nitrothiazole with the adduct of triethylamine and sulfur trioxide in a solvent and subsequently with an alkali metal hydroxide.

10. A method of preparing sodium-(2-sulfamino-5-nitrothiazole) which comprises heating 2-amino-5-nitrothiazole with the adduct of triethylamine and sulfur trioxide in ethylene dichloride and subsequently with sodium hydroxide and recovering said compound therefrom.

11. A method of preparing sodium-(2-sulfamino-5-nitropyrimidine) which comprises heating 2-amino-5-nitropyrimidine with the adduct of triethylamine and sulfur trioxide in ethylene dichloride and subsequently with sodium hydroxide and recovering said compound therefrom.

12. A method of preparing sodium-(2-sulfamino-5-nitropyridine) which comprises heating 2-amino-5-nitropyridine with the adduct of triethylamine and sulfur trioxide in ethylene dichloride and subsequently with sodium hydroxide and recovering said compound therefrom.

ROBERT P. PARKER.
JOHN S. WEBB.

No references cited.